US007856244B2

(12) United States Patent
Lee et al.

(10) Patent No.: US 7,856,244 B2
(45) Date of Patent: Dec. 21, 2010

(54) METHOD AND APPARATUS FOR CONTROLLING VECTOR GRAPHIC IN MOBILE PHONE

(75) Inventors: Sang Yun Lee, Daejeon (KR); Hae Sook Jeon, Daejeon (KR); Kyung Hee Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 677 days.

(21) Appl. No.: 11/844,665

(22) Filed: Aug. 24, 2007

(65) Prior Publication Data

US 2008/0064447 A1  Mar. 13, 2008

(30) Foreign Application Priority Data

Sep. 7, 2006   (KR) ...................... 10-2006-0086133

(51) Int. Cl.
*H04M 1/00* (2006.01)
(52) U.S. Cl. ................. 455/550.1; 455/566; 455/556.1; 345/169
(58) Field of Classification Search .............. 455/550.1, 455/556.1, 566; 345/169
See application file for complete search history.

(56) References Cited

U.S. PATENT DOCUMENTS

| | | | | |
|---|---|---|---|---|
| 7,158,817 | B2* | 1/2007 | Kubo | 455/575.3 |
| 7,463,885 | B2* | 12/2008 | Peon et al. | 455/419 |
| 7,656,275 | B2* | 2/2010 | Marui | 340/309.16 |
| 2006/0258289 | A1* | 11/2006 | Dua | 455/41.3 |
| 2007/0123251 | A1* | 5/2007 | McElvaney | 455/426.1 |
| 2007/0281606 | A1* | 12/2007 | Baunach | 455/3.06 |
| 2007/0293273 | A1* | 12/2007 | Rochford | 455/566 |
| 2008/0015881 | A1* | 1/2008 | Shankar | 705/1 |

FOREIGN PATENT DOCUMENTS

KR   1020050064113   6/2005

OTHER PUBLICATIONS

Korean Office Action for 2006-16133.
Korean Office Action for 10-2006-0086133.

* cited by examiner

*Primary Examiner*—Danh C Le
(74) *Attorney, Agent, or Firm*—Lowe Hauptman Ham & Berner LLP

(57) ABSTRACT

Provided is a mobile phone including: a transceiver for receiving voice and data signals from outside; a voice processing part for demodulating the voice signal input from the transceiver and outputting the voice signal as a voice, and modulating a voice received from outside and converting the voice into a voice signal; a control part for processing the voice signal and the data signal received from the transceiver; a display part controlled by the control part to display a vector graphic; a memory for storing an operating program of the control part and a system program; a vector graphic processing part for producing and modulating a vector graphic in response to control of the control part and outputting the vector graphic to the display part; and a button including an input part for transmitting an input from outside to the control part, the input part performing the function of connecting to a wireless Internet service when pressed and controlling the size of the vector graphic when rolled.

2 Claims, 6 Drawing Sheets

METHOD AND APPARATUS FOR CONTROLLING VECTOR GRAPHIC IN MOBILE PHONE

CROSS-REFERENCE TO RELATED APPLICATION

This application claims priority to and the benefit of Korean Patent Application No. 2006-0086133, filed Sep. 7, 2006, the disclosure of which is incorporated herein by reference in its entirety.

BACKGROUND

1. Field of the Invention

The present invention relates to a method and apparatus for controlling a vector graphic in a mobile phone.

2. Discussion of Related Art

A vector graphic is a digital image produced by a series of instructions or mathematical expressions defining lines or phases in a 2- or 3-dimensional space. In a vector graphic, for example, locations of a series of points to be connected are contained in a vector graphic file instead of storing each bit to draw lines. Consequently, the size of the file corresponding to the graphic is smaller. Also, since the vector graphic file shows the relations of each point, it is very easy to change the size or location of the image, unlike a bit-type image file. That is, although the size is reduced or enlarged, the image is not deformed or distorted.

A couple of exemplary types of vector graphics are OpenVG established by Chronos Group and Scalable Vector Graphic (SVG) established by W3C. OpenVG provides API for a low-level function to support vector graphics, and SVG is a language made on the basis of XML to express vector graphics.

Meanwhile, the ongoing development of mobile communication technology has seen the development and incorporation of various functions into mobile phones. Thus, the mobile phone has become portable digital equipment that not only enables voice communication but can also display graphics and even motion pictures.

Some mobile phones have a touch-screen or some other advanced input device, but a keypad and a microphone are the basic interface means.

However, it is inconvenient to control vector graphics with such a conventional mobile phone. One of the biggest merits of vector graphics is that there is no distortion of the screen, even if the graphic is enlarged or reduced. In order to take full advantage of this property, it is necessary to have a convenient input apparatus which can enlarge or reduce of the screen more easily.

SUMMARY OF THE INVENTION

The present invention is directed to a method and apparatus for conveniently controlling vector graphics in a mobile phone.

The present invention is also directed to a method and apparatus for controlling the sizes of vector graphics by right and left movement of a button, rather than pressing of a button.

One aspect of the present invention provides a mobile phone comprising: a transceiver for receiving voice and data signals from outside; a voice processing part for demodulating the voice signal input from the transceiver and outputting the voice signal as a voice, and modulating a voice received from outside and converting the voice into a voice signal; a control part for processing the voice signal and the data signal received from the transceiver; a display part controlled by the control part to display a vector graphic; a memory for storing an operating program of the control part and a system program; a vector graphic processing part for producing and modulating a vector graphic in response to control of the control part and outputting the vector graphic to the display part; and a button including an input part for transmitting an input from outside to the control part, the input part performing the function of connecting to a wireless Internet service when pressed and controlling the size of the vector graphic when rolled.

The input part may further comprise a location moving button which moves the location of the vector graphic displayed on the display part.

Another aspect of the present invention provides a method of outputting a vector graphic on a mobile phone comprising an input part, a vector graphic processing part, a display part and a control part, the method comprising the steps of: rolling, by a user, a size control button of which one end projects from a horizontal plane of the input part; transmitting, by the control part, a vector graphic size changing signal to the vector graphic processing part in response to rolling of the size control button; changing, by the vector graphic processing part, the size of the vector graphic in response to the size changing signal; and outputting, by the display part, the vector graphic whose size has been changed.

BRIEF DESCRIPTION OF THE DRAWINGS

The above and other features and advantages of the present invention will become more apparent to those of ordinary skill in the art by describing in detail exemplary embodiments thereof with reference to the attached drawings in which.

DETAILED DESCRIPTION OF EXEMPLARY EMBODIMENTS

Hereinafter, exemplary embodiments of the present invention will be described in detail. However, the present invention is not limited to the exemplary embodiments disclosed below, but can be implemented in various forms. The following exemplary embodiments are described to fully enable those of ordinary skill in the art to embody and practice the invention.

Figure 1:
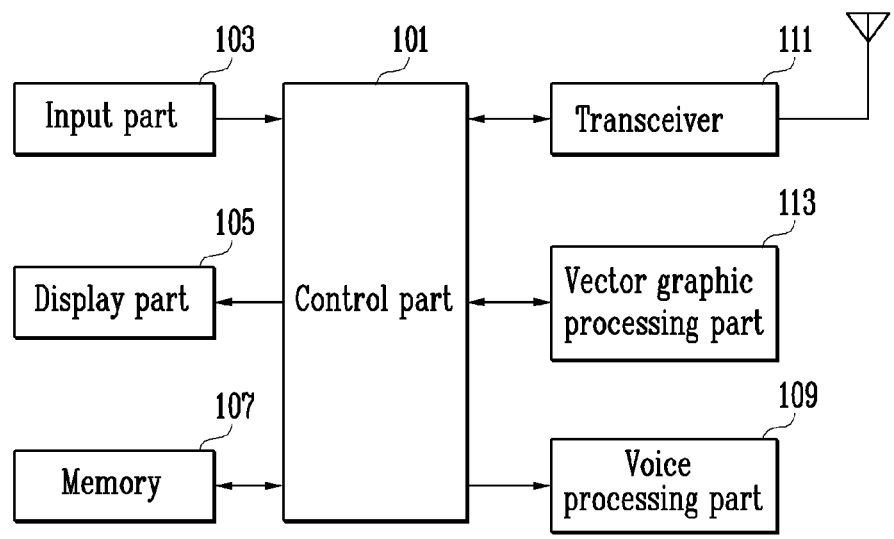
FIG. 1 is a diagram illustrating a structure of a mobile phone for providing a function of vector graphic size control according to an exemplary embodiment of the present invention.

FIG. 1 is a diagram illustrating a structure of a mobile phone for providing a function of vector graphic size control according to an exemplary embodiment of the present invention.

Referring to FIG. 1, the mobile phone comprises a control part (CPU) 101, an input part 103, a display part 105, a memory 107, a voice processing part 109, a transceiver 111, and a vector graphic processing part (VG) 113.

The control part 101 receives a signal processed in the transceiver 111 and controls the general operation of the mobile phone. Also, when vector graphic size control instructions are input through the input part 103, the control part 101 functions to transmit the vector graphic size control instructions to the vector graphic processing part 113.

The input part 103 functions to transmit various instructions from the user to the mobile phone through an interface such as a keypad or a microphone. The input part 103 of the present invention comprises a size control button which can change the size of the vector graphic.

The display part 105 is a display device such as a liquid crystal display (LCD), and may include a vibration apparatus, a speaker, etc. The display part 105 is controlled by the control part 101 and displays the processing status of program or the state of the mobile phone. That is, the display part 105 displays the general status of the mobile phone and information input by a user. Also, the display part 105 displays the vector graphic processed in the vector graphic processing part 113.

The memory 107 stores the operation program of the control part 101 and the system program in a read only memory (ROM) area that is typically included in the mobile phone and can be erased if necessary. Types of ROM that can be electrically erased include EEPROM, flash memory, etc. Also, the memory 107 comprises random access memory (RAM) which temporarily stores data generated while processing various operation programs.

The voice processing part 109 modulates a voice signal input from the microphone and converts it into voice data, demodulates voice data input from the transceiver 111 and voice data stored in the memory 107 into a voice signal, and outputs the voice signal through a speaker.

The transceiver 111 is controlled by the control part 101 to convert a signal output from the control part 101 into a radio signal, and convert and output a radio signal received by an antenna into a desired signal.

The vector graphic processing part 113 receives instructions from the control part 101, produces and converts a vector graphic, and outputs the vector graphic to the display part 105. The vector graphic has the advantage of a smaller file size than a general bit-type graphic and it is easy to change, but the vector graphic can only be processed with the vector graphic processing part 113.

Also, the vector graphic processing part 113 can change the size and/or location of a vector graphic in response to manipulation of the size control button.

Figure 2:
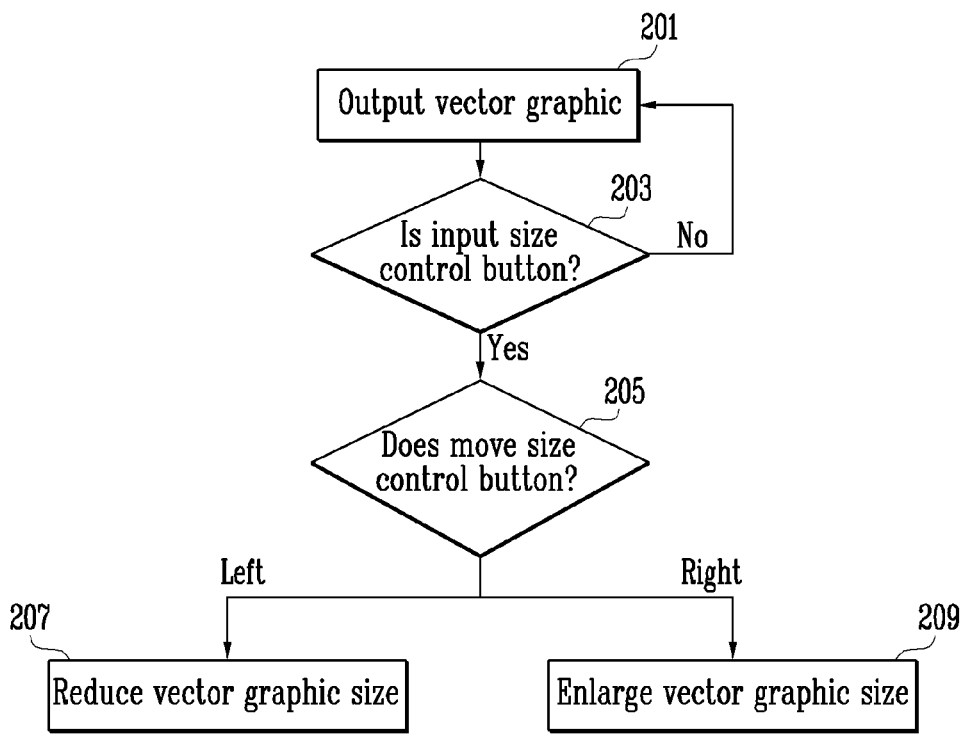
FIG. 2 is a flowchart of a process of controlling the size of a vector graphic using a size control button of a mobile phone according to an exemplary embodiment of the present invention.

FIG. 2 is a flowchart of a process of changing the size of a vector graphic using a size control button of a mobile phone according to an exemplary embodiment of the present invention.

Referring to FIG. 2, a vector graphic is displayed on the display part 105 of the mobile phone according to the present invention (Step 201). Thereafter, when the user manipulates the size control button, the control part 101 determines whether or not the size control button is rolled, i.e., moved perpendicular to its major axis (Step 203). If the size control button is not rolled, the output screen of the vector graphic remains as is, and if the size control button is rolled, the movement direction is determined (Step 205).

Thereafter, if the size control button is rolled to the left, the size of the vector graphic displayed in the display part 105 is reduced corresponding to the movement distance (Step 207). And, if the size control button is rolled to the right, the size of the vector graphic displayed in the display part 105 is enlarged corresponding to the movement distance (Step 209).

By the above steps, the mobile phone according to the present invention can easily control the size of the vector graphic.

Figure 3:
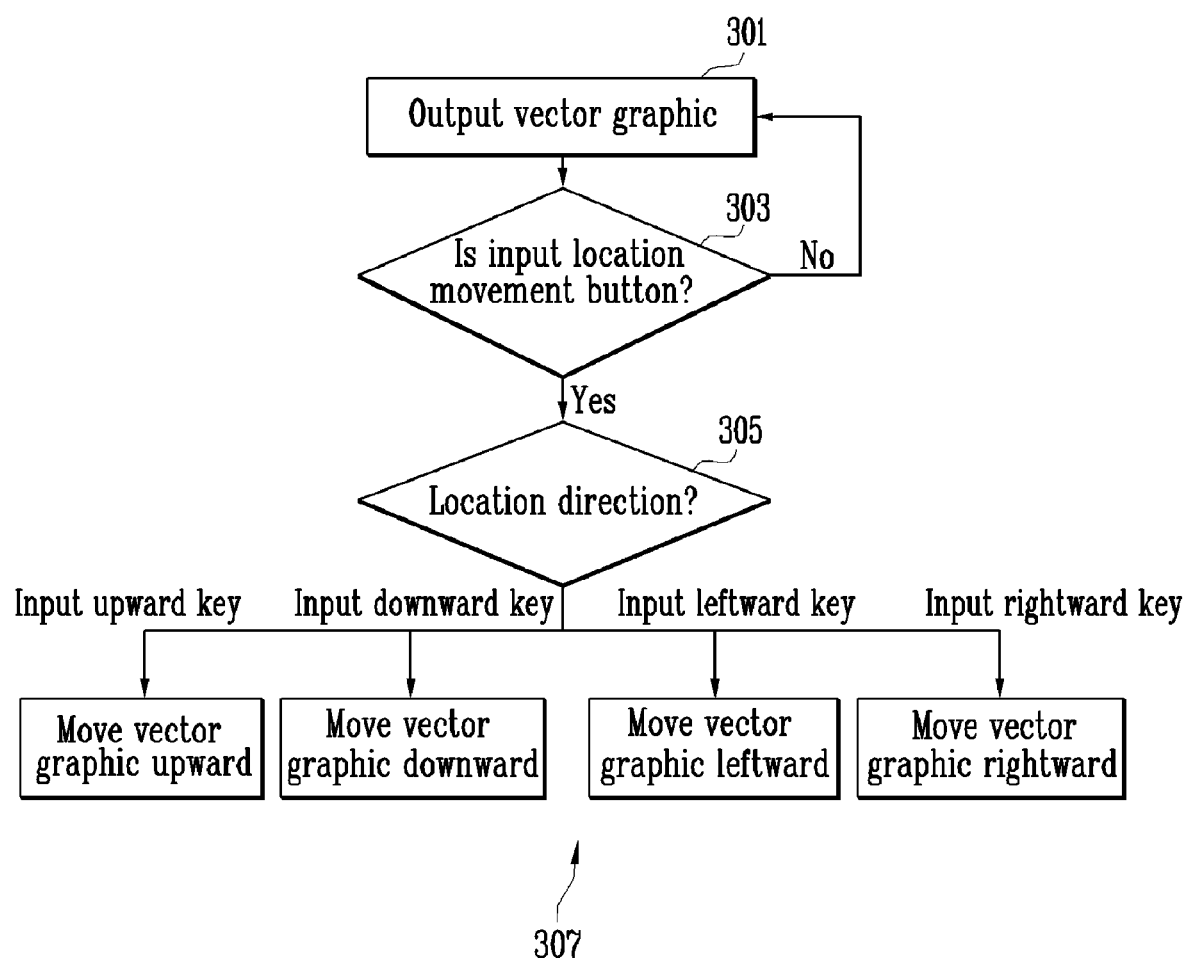
FIG. 3 is a flowchart of a process of changing the location of a vector graphic using a location moving button of a mobile phone according to an exemplary embodiment of the present invention.

FIG. 3 is a flowchart of a process of changing the location of a vector graphic using a location moving button of a mobile phone according to an exemplary embodiment of the present invention.

Referring to FIG. 3, a vector graphic is displayed on the display part 105 of the mobile phone of the present invention (Step 301). Thereafter, when the user inputs one of the location movement buttons, the control part 101 first determines whether or not the location movement button is input (Step 303). If it is not input, the output screen of the vector graphic remains as is, and if it is input, the movement direction is determined (Step 305).

Next, it is determined whether the input location movement button is an upward movement button, a downward movement button, a leftward movement button, or a rightward movement button, and the display location of the vector graphic is moved accordingly (Step 307).

Figure 4:
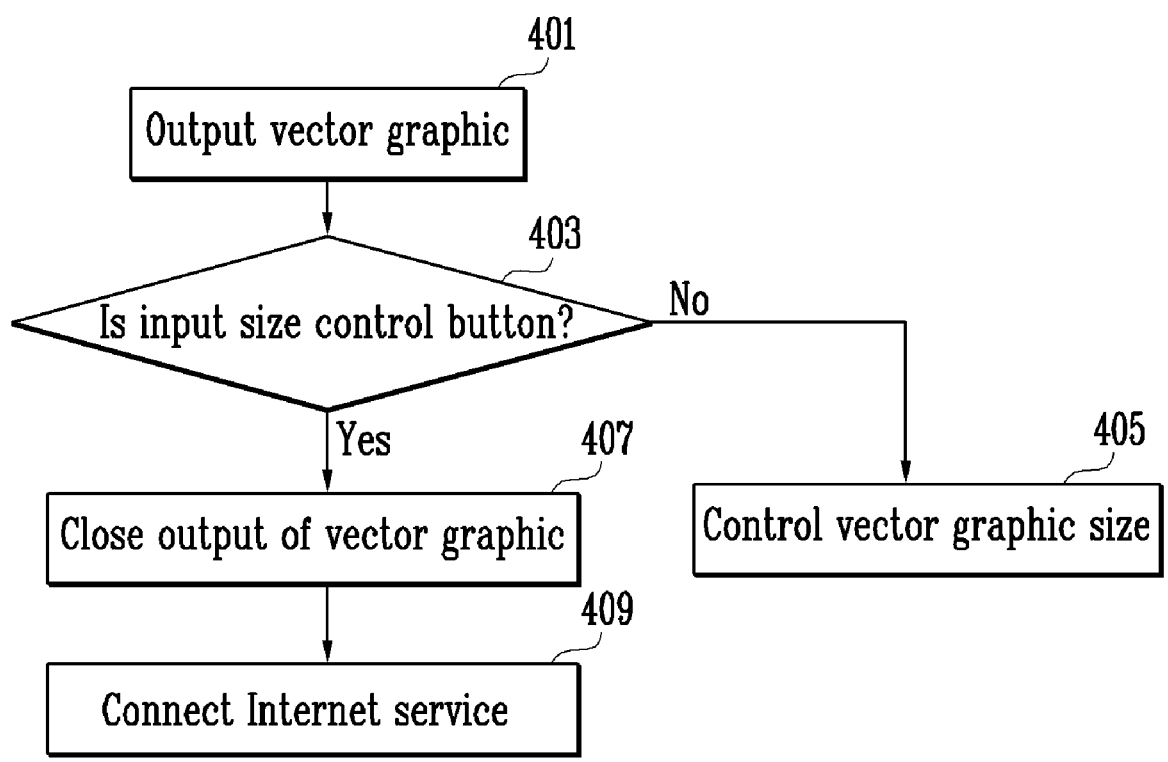
FIG. 4 is a flowchart illustrating connection to the Internet using a size control button of a mobile phone according to an exemplary embodiment of the present invention.

FIG. 4 is a flowchart illustrating connection to the Internet using a size control button of a mobile phone according to an exemplary embodiment of the present invention.

Referring to FIG. 4, a vector graphic is displayed on the display part 105 of the mobile phone of the present invention (Step 401). Thereafter, when the user inputs the size control button, the control part 101 determines whether or not the size control button is pushed (Step 403). If it is not pushed, size control of the vector graphic is performed as shown in FIG. 3, and if it is pushed, the output vector graphic screen is closed (Step 407).

Next, the mobile phone of the present invention wirelessly connects to the Internet (Step 409).

Figure 5:
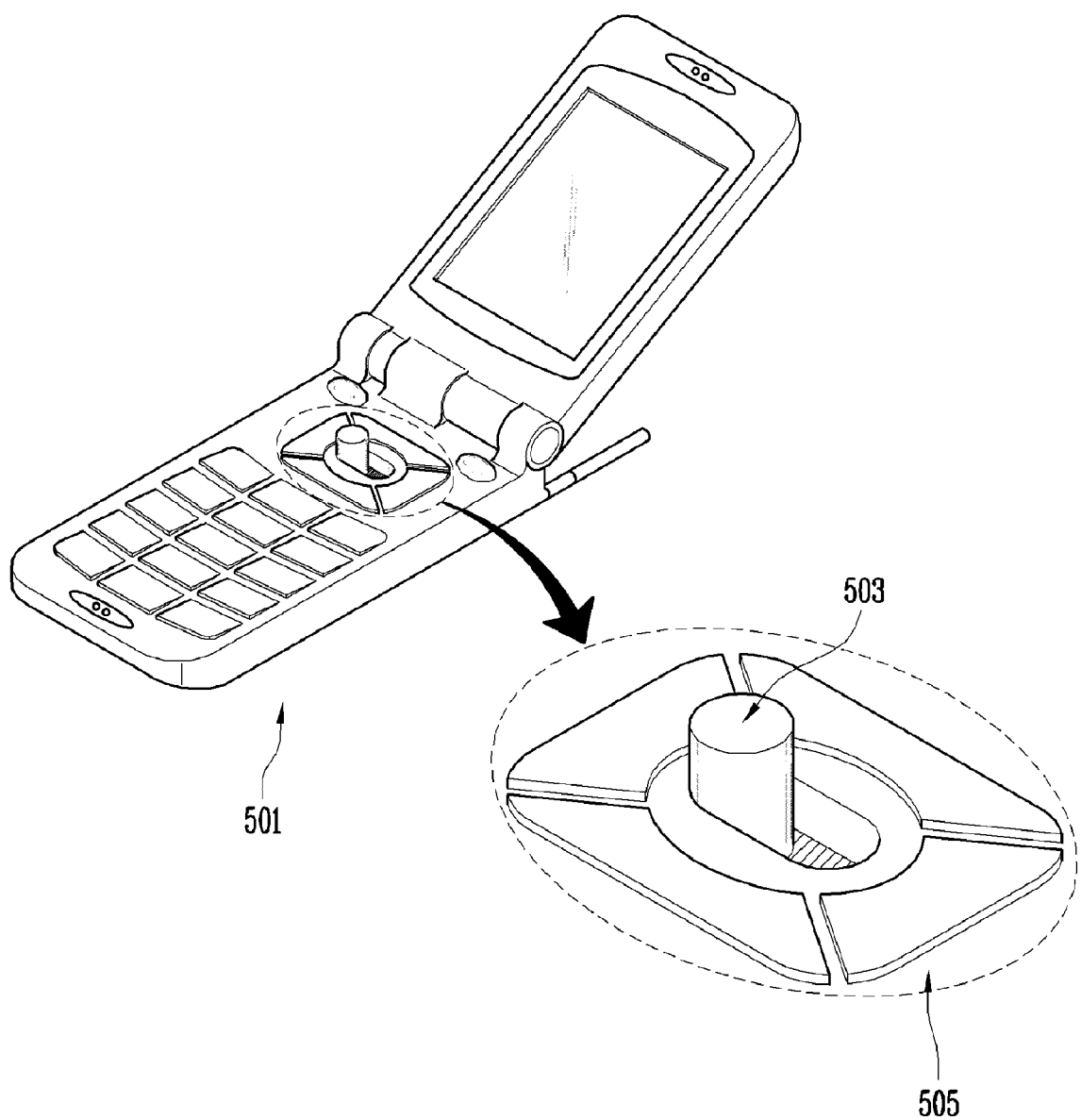
FIG. 5 is a schematic diagram of a mobile phone according to an exemplary embodiment of the present invention.

FIG. 5 is a schematic diagram of a mobile phone according to an exemplary embodiment of the present invention.

Referring to FIG. 5, the mobile phone 501 of the present invention may have the same form as a general mobile phone. The present invention can be applied not only to the mobile phone schematically shown in FIG. 5, but to any type of mobile phone such as a bar phone, a flip phone, a slide phone, etc.

The mobile phone 501 of the present invention has the size control button 503 where an Internet connection button is on conventional mobile phones.

A transverse groove in the lower keypad enables the size control button 503 to be rolled to the right and the left.

With the above construction, the size of a vector graphic can be easily controlled by the size control button 503.

Also, since the size control button 503 can be pushed, it can function as a conventional Internet connection button.

Also, the location movement button 505 is placed around the size control button 503. However, unlike the conventional location movement button, the location movement button 505 of the present invention can be used to move a vector graphic screen up, down, left and right on the display part.

Figure 6:
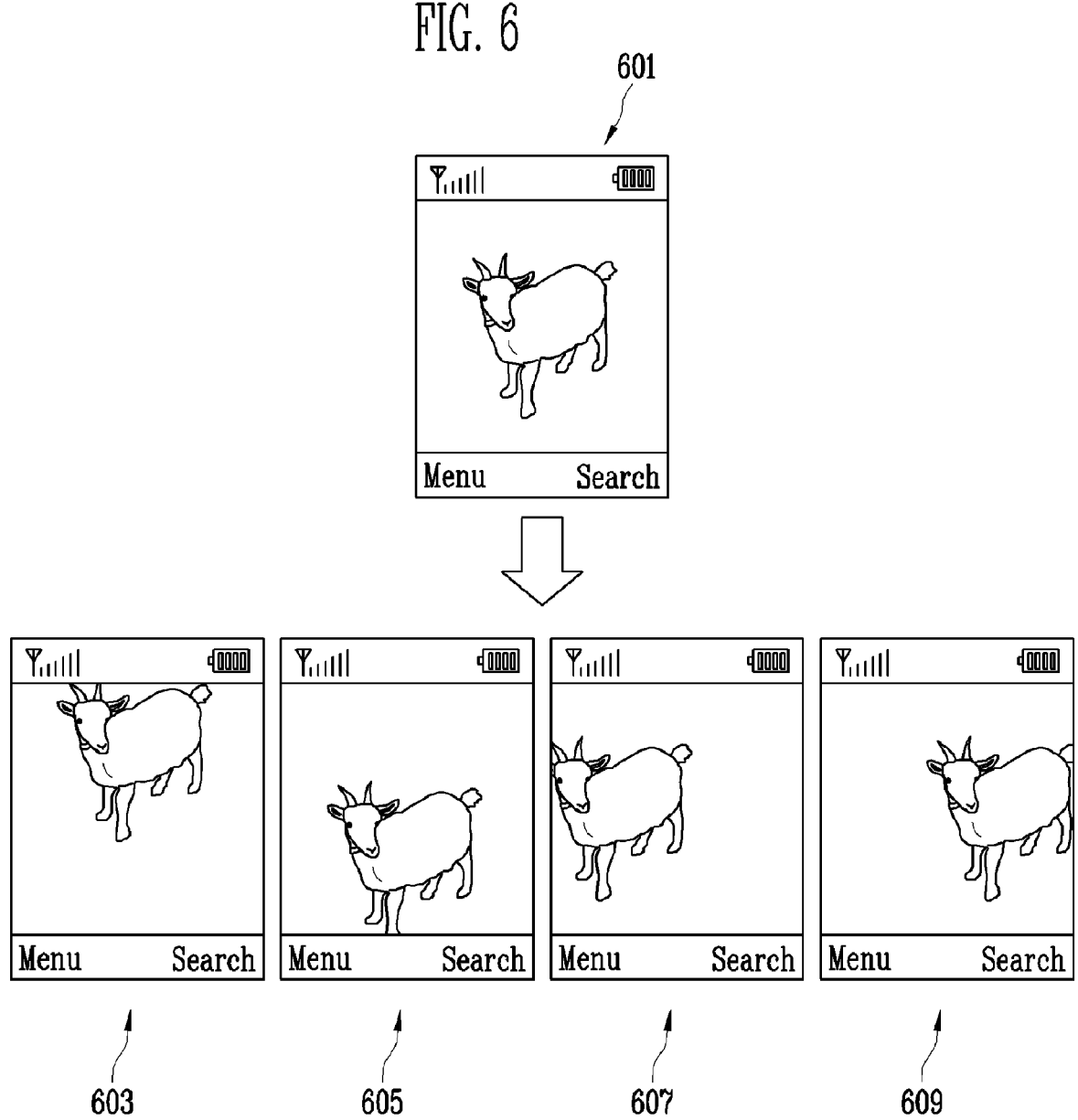
FIG. 6 is a schematic diagram illustrating location movement of a vector graphic of a mobile phone according to an exemplary embodiment of the present invention.

FIG. 6 is a schematic diagram illustrating location movement of a vector graphic of a mobile phone according to an exemplary embodiment of the present invention.

Referring to FIG. 6, a vector graphic screen is displayed on the mobile phone (Step 601). Afterwards, the vector graphic screen can be moved by inputting the location movement button 505 shown in FIG. 5. When an upward movement button of the location movement button 505 is input, the vector graphic moves upward as shown by reference numeral 603. When a downward movement button of the location movement button 505 is input, the vector graphic moves downward as shown by reference numeral 605. When a leftward movement button of the location movement button 505 is input, the vector graphic moves to the left as shown by reference numeral 607. When a rightward movement button of the location movement button 505 is input, the vector graphic moves to the right as shown by reference numeral 609.

Figure 7:
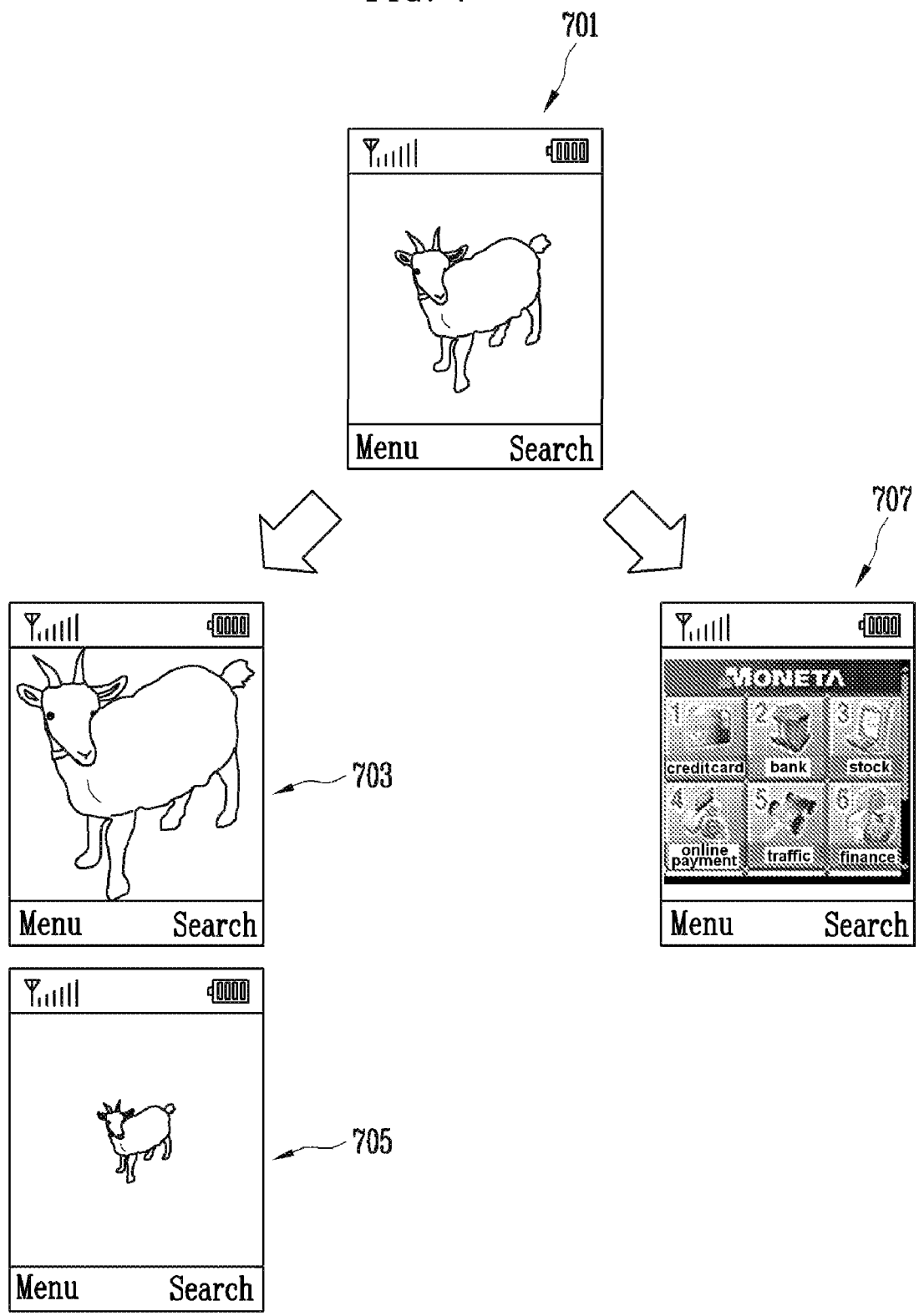
FIG. 7 is a schematic diagram illustrating size control of a vector graphic of a mobile phone according to an exemplary embodiment of the present invention.

FIG. 7 is a schematic diagram illustrating size control of a vector graphic of a mobile phone according to an exemplary embodiment of the present invention.

Referring to FIG. 7, a vector graphic screen is displayed on the mobile phone (Step 701). Afterwards, the size of the vector graphic screen can be controlled by manipulating the size control button 503 shown in FIG. 5. When the size control button 503 is rolled to the left without pushing it, the displayed vector graphic gradually gets smaller corresponding to the rolled distance (Step 703). Conversely, if the size control button is rolled to the right without pushing it, the displayed vector graphic gradually gets bigger corresponding to the rolled distance (Step 703).

Meanwhile, if the size control button 503 is pushed without rolling to the left or right, the display part of the vector graphic closes and the mobile phone connects to the Internet as if the conventional Internet connection button was pushed.

The present invention provides a method and apparatus for easily controlling vector graphics on a mobile phone.

Also, the present invention provides a method and apparatus for controlling the size of vector graphics by left and right rolling of a button, rather than pushing of the button.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A mobile phone comprising:
   a transceiver for receiving voice and data signals from outside;
   a voice processing part for demodulating the voice signal input from the transceiver and outputting the voice signal as a voice, and modulating a voice received from outside and converting the voice into a voice signal;
   a control part for processing the voice signal and the data signal received from the transceiver;
   a display part controlled by the control part to display a vector graphic;
   a memory for storing an operating program of the control part and a system program;
   a vector graphic processing part for producing and modulating a vector graphic in response to control of the control part and outputting the vector graphic to the display part; and
   a button including an input part for transmitting an input from outside to the control part, the input part performing the function of connecting to a wireless Internet service when pressed and controlling the size of the vector graphic when rolled.

2. The mobile phone according to claim 1, wherein the input part further comprises a location movement button for moving the location of the vector graphic displayed on the display part.

* * * * *